No. 679,301. Patented July 30, 1901.
I. EDMONDSON.
TURF AND LAND CUTTER.
(Application filed Apr. 27, 1901.)
(No Model.)
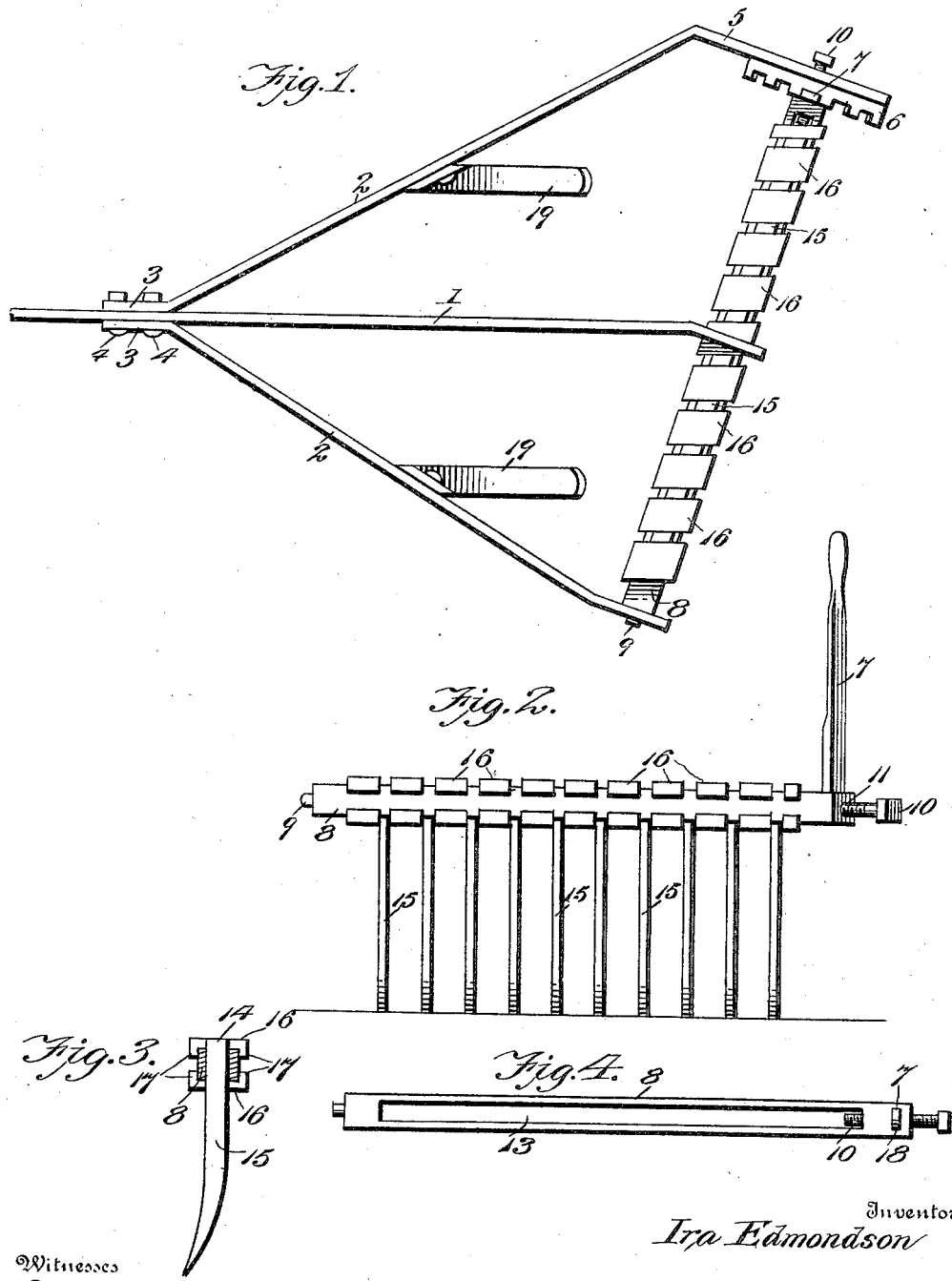
Witnesses
Edwin G. McKee
Geo. Ackman
Inventor
Ira Edmondson
By Victor J. Evans.
Attorney
THE NORRIS PETERS CO., PHOTO-LITHO., WASHINGTON, D. C.

UNITED STATES PATENT OFFICE.

IRA EDMONDSON, OF BLUE, MISSISSIPPI.

TURF AND LAND CUTTER.

SPECIFICATION forming part of Letters Patent No. 679,301, dated July 30, 1901.

Application filed April 27, 1901. Serial No. 57,747. (No model.)

*To all whom it may concern:*

Be it known that I, IRA EDMONDSON, a citizen of the United States, residing at Blue, in the county of Calhoun and State of Mississippi, have invented new and useful Improvements in Turf and Land Cutters, of which the following is a specification.

This invention relates to turf and land cutters; and the object in view is to provide a simple and effective machine for cutting and tearing up roots, vines, and other undergrowth in cultivating the soil. The machine comprises, in connection with a suitable frame, a knife-bar arranged obliquely to the draft and having connected thereto a series of knife-blades which are arranged edgewise to the line of draft, means also being provided for rocking the knife-bar and tilting the knives or blades to any desired angle and to either a forward or rearward inclination, whereby the depth of penetration of the blades may be regulated.

Other objects and advantages of the invention will appear in the course of the ensuing description.

The invention consists in a turf and land cutter embodying certain novel features and details of construction and arrangement of parts, as hereinafter fully described, illustrated in the drawings, and incorporated in the claims.

In the accompanying drawings, Figure 1 is a plan view of a machine constructed in accordance with the present invention. Fig. 2 is a rear elevation of the knife-bar and showing the manner of connecting the knives to the bar. Fig. 3 is a detailed cross-section through the knife-bar, showing one of the knives or blades. Fig. 4 is a plan view of the knife-bar.

Similar numerals of reference designate corresponding parts in all the figures.

The turf and land cutter contemplated in this invention comprises a frame having a central longitudinal bar 1, to which the draft-animals are adapted to be hitched for drawing the machine across the field. Connected to the central bar 1 are rearwardly-diverging side bars 2, of unequal length and having their forward ends bent to form flanges 3, which are secured to the central bar 1 on opposite sides thereof and at the same point in the length of the bar 1 by means of bolts or other suitable fastenings 4. The rear end of the longer side bar 2 is bent to form a terminal portion 5, which is parallel to the rear end of the other side bar 2, as clearly shown in Fig. 1, and connected with the terminal portion 5 is a segmental rack 6, having inwardly-facing teeth adapted to engage and hold the tilting lever 7, the purpose of which will hereinafter appear.

In connection with the frame above described I employ a knife-bar 8, which extends between the rear ends of the diverging side bars and is provided with end journals 9 and 10, the latter of which is in the form of a clamping-screw. These journals are received in bearing-openings 11 in the rear ends of the side bars. The knife-bar 8, which extends obliquely to the line of draft, also passes through an opening 12 in the rear end of the central longitudinal bar 1, the opening 12 being preferably of sufficient size to receive the knife-bar and allow it to turn readily. The knife-bar is also provided with a longitudinal slot 13, which extends practically the entire length thereof and in which are received the shanks 14 of a series of knife blades or cutters 15, each having its body, as well as its shank, set oblique to the knife-bar and in line with the draft of the machine. The blades 15 are held a suitable distance apart by means of spacing-blocks 16, having terminal flanges 17, which embrace the bar on opposite sides. The blocks 16 are arranged in pairs above and beneath the knife-bar, as illustrated, and all of the blades and blocks are securely clamped and held by the screw 10.

Near one end the knife-bar is provided with another opening 18 to receive the lower end of the tilting lever 7, and said lever has an opening for the reception of screw 10. All of the knife-blades and also the tilting lever are thus rigidly secured to the knife-bar by means of the single rod-fastener, consisting of the screw 10, which also forms the journal-support for the knife-bar and its blades or cutters. By moving the tilting lever forward or backward any desired inclination may be given to the blades or cutters, and by swinging said lever far enough to the front or rear the blades or cutters may be lifted entirely out of engagement with the ground, the machine resting upon a pair of runners 19, bolted or otherwise secured to the diverging side bars 2 of the frame, as shown in Fig. 1.

The machine operates effectively to cut and sever roots, vines, and other undergrowth and at the same time loosen and break up the soil. By tilting the points of the blades rearward they will operate with a drag section on the soil without penetrating very deeply, and by tilting the blades forward they will tend to enter and penetrate the soil to a greater extent, thereby more thoroughly loosening and breaking up and cultivating the ground. This action is enhanced by reason of the fact that when the knife-blades are tilted forward they also operate at a slight angle and tend to lift the soil as well as the roots and undergrowth after cutting and severing the latter. The machine is also of light draft and will operate easily in the field.

Changes in the form, proportion, and minor details of construction may be resorted to without departing from the spirit or sacrificing any of the advantages of the invention.

Having thus fully described my invention, what I claim as new, and desire to secure by Letters Patent, is—

1. In a turf and land cutter, a frame comprising a central longitudinal bar, rearwardly-diverging side bars of unequal length connected thereto at a common point and arranged on opposite sides of the central bar, supporting-runners connected to the side bars, a knife-bar oblique to the line of draft and having end journals which connect the ends of the knife-bar to the side bars of the frame, and means for rocking and holding the knife-bar.

2. In a turf and land cutter, a frame comprising rearwardly-diverging side bars of unequal length, supporting-runners connected thereto, a knife-bar oblique to the line of draft and journaled between the side bars, knife-blades having their shanks inserted in a slot in the knife-bar, spacing-blocks interposed between shanks of the blades and embracing the knife, a fastener for holding all of the blades and blocks in place, and a tilting lever connected to said knife-bar.

3. In a turf and land cutter, a frame comprising rearwardly-diverging side bars of unequal length, a knife-bar oblique to the line of draft and journaled between the side bars, knife-blades having their shanks inserted in a slot in the knife-bar and set edgewise to the line of draft, spacing-blocks interposed between said shanks and embracing the knife-bar, a single clamping device for holding all the blades in place, and a tilting lever connected to said knife-bar.

In testimony whereof I affix my signature in presence of two witnesses.

IRA EDMONDSON.

Witnesses:
R. L. MOORE,
H. CANNON.